United States Patent [19]

Tims et al.

[11] Patent Number: 4,493,063

[45] Date of Patent: Jan. 8, 1985

[54] METHOD AND APPARATUS FOR SEISMIC GEOPHYSICAL EXPLORATION

[75] Inventors: Harold A. Tims, Bartlesville, Okla.; Sheldon E. Elliott, London, England; Orin C. Montgomery; William N. Doggett, both of Bartlesville, Okla.

[73] Assignee: Phillips Petroleum Company, Bartlesville, Okla.

[21] Appl. No.: 955,745

[22] Filed: Oct. 30, 1978

[51] Int. Cl.³ .............................................. G01V 1/16
[52] U.S. Cl. ..................................... 367/77; 73/1 DV
[58] Field of Search .................. 367/13, 77; 73/1 DV; 179/175.3 F; 324/51, 52; 340/151, 163, 505, 518; 371/32

[56] References Cited

U.S. PATENT DOCUMENTS

| | | | |
|---|---|---|---|
| 3,062,315 | 11/1962 | Herzog | 367/76 |
| 3,350,687 | 10/1967 | Gabrielsan et al. | 340/163 |
| 3,397,386 | 8/1968 | Bishup et al. | 340/151 |
| 3,516,063 | 6/1970 | Arkin et al. | 340/505 |
| 3,748,638 | 7/1973 | Montgomery et al. | 367/77 |
| 3,806,864 | 4/1974 | Broding et al. | 367/77 |
| 3,879,577 | 4/1975 | Progler | 371/32 |
| 3,932,841 | 1/1976 | Deerfield et al. | 371/32 |
| 3,946,357 | 3/1976 | Weinster et al. | 367/76 |
| 3,952,283 | 4/1976 | Broding | 367/76 |
| 3,979,719 | 9/1976 | Toaby et al. | 371/32 |
| 4,010,442 | 3/1977 | Brodig | 367/77 |
| 4,017,833 | 4/1977 | Broding | 367/77 |
| 4,019,172 | 4/1977 | Srodes | 340/518 |
| 4,042,906 | 8/1977 | Ezell | 367/76 |
| 4,068,211 | 1/1978 | Tal | 371/32 |
| 4,086,504 | 4/1978 | Ezell et al. | 367/77 |
| 4,100,542 | 7/1978 | Galbert et al. | 340/518 |
| 4,112,412 | 9/1978 | Hawlett | 367/77 |
| 4,152,691 | 5/1979 | Word | 367/77 |

FOREIGN PATENT DOCUMENTS 2102838  3/1972  France ................................ 367/77

OTHER PUBLICATIONS

Haas et al., "Error Recovery Technique", 10/72, pp. 1537-1538, IBM Tech. Disc. Bull., vol. 15, #5.

"Gus-Bus Digital Seismic Telemetry System", 9/77, p. 21, Gus Manufacturing Co., Houston, Texas.

*Primary Examiner*—Nelson Moskowitz
*Attorney, Agent, or Firm*—French, Hughes, and Doescher

[57] ABSTRACT

A method and apparatus for seismic geophysical exploration is disclosed wherein the seismic exploration system includes a seismic energy source, a central recording and control station, a plurality of geophones, and a plurality of remote geophone monitoring means. The central control and recording station is coupled to the plurality of geophone monitoring means by a two-way radio frequency (RF) link. The central recording and control station interrogates the plurality of geophone monitoring means by means of the two-way RF line to thereby determine the operating status of the plurality of geophone monitoring means. The operational status of the plurality of geophone monitoring means is transmitted from each of the plurality of geophone monitoring means via the two-way RF link to the central recording and control station in response to a specific address for each of the plurality of remote geophone monitoring means. After it has been determined that the plurality of remote geophone monitoring means are operational, the central recording and control station initiates operation of the seismic energy source. The reflected energy imparted into the earth by the seismic energy source is detected by the plurality of geophones. Apparatus contained within the remote monitoring means, associated with particular geophones, samples the signals detected by the geophones and produces representative data in digital form. The digitized data is stored in a memory contained within the geophone monitoring means and is transmitted on demand to the central recording and control unit. Error detection and retransmission of data from the remote geophone monitoring means to the central recording and control station is utilized to increase the reliability of data transmitted by means of the two-way RF link which couples the central recording and control station to the plurality of remote geophone monitoring means.

40 Claims, 3 Drawing Figures

METHOD AND APPARATUS FOR SEISMIC GEOPHYSICAL EXPLORATION

This invention relates to seismic exploration. In a specific aspect this invention relates to a seismic exploration system in which a plurality of remote geophone monitoring means are coupled to a central control and recording station by means of a two-way RF link. In another specific aspect this invention relates to a seismic exploration system in which a two-way RF link is utilized to provide a central control and recording station with information regarding the operational status of a plurality of remote geophone monitoring means to thereby increase the reliability of the seismic exploration system. In still another aspect this invention relates to a seismic exploration system in which error detection and retransmission of data, as required to correct any errors detected, is utilized to increase the reliability of data transmitted by means of a two-way RF link which couples a central control and recording station to a plurality of remote goephone monitoring units.

The seismic method of mapping geological subsurfaces of the earth involves the use of a source of seismic energy and the reception of the seismic energy by an array of seismic detectors, generally referred to as geophones. When used on land the soure of seismic energy generally is a high explosive charge electrically detonated in a borehole located at a selected grid point in a terrain or is an energy source capable of delivering a series of impacts to the earth's surface such as that used in Vibroseis systems. The acoustic waves generated in the earth by the explosion or impacts are reflected back from pronounced strata boundaries and reach the surface of the earth after varing intervals of time, depending on the distance and the nature of the subsurface traversed. These returning acoustic waves are detected by the geophones, which function to transduce such acoustic waves into representative electrical signals. The plurality of geophones are arrayed in a selected manner to detect most effectively the returning acoustic waves and generate electrical signals representative thereof from which data may be deduced concerning the geological subsurface of the earth.

Many different types of geophones are commericlly available. Preferably the Mark L15B geophone manufactured by Mark Products, Inc. is utilized in the present seismic exploration system.

It is common today in seismic exploration to utilize forty-eight or more geophone stations simultaneously for every shot-point location. The geophone stations are commonly laid out in a line which is referred to as a "seismic exploration spread". A forty-eight channel spread will usually extend for seven to nine miles. In many seismic systems utilized today in seismic exploration, the geophone stations are electrically connected to a central recording apparatus by means of long multi-conductor or coaxial cable. The electrical signals generated by the geophone stations are coupled through the cable to the central recording apparatus.

It is well known that numerous problems are involved in the use of long cables to bring the signals from the geophone stations to the central recording station. Resistivity losses can be quite high; the lines tend to pick up extraneous electrical noises; the cables tend to dictate that the arrays of geophones be linear; the geophone intervals are fixed by the construction of the cables; laying out the cable itself may be a major undertaking, such as in jungles, swamp or marsh; the cables are subject to attack by animals as well as humans; the cables are subject to water infiltration and mechanical damage; and the cables are expensive and require repairs, upkeep and spare parts in remote areas.

There have been many attempts to develop improved seismic geophysical exploration systems which, among other things, eliminate the use of long cables. The most common attempt has been the development of RF links to replace the long cable previously utilized. Many of these attempts have centered around the use of remote geophone monitoring units which are equipped with radios capable of transmitting the data obtained by the geophone stations to the central recording unit. However, numerous problems have been encountered in the implementation of RF communication systems in seismic exploration systems. The primary problem encountered has been the lack of reliability of the data received at the central recording station. Under noisy conditions data is lost during transmission and data is erroneously received causing unacceptable error rates in the data recorded at the central recording station. Also under noisy conditions, the time of the shot by the seismic energy source may be uncertain and thus lead to degradation of the seismic data.

In an effort to correct these problems which have been encountered in the use of a RF link between a plurality of remote goephone monitoring units and a central recording unit, more recent systems have employed recording systems at the remote geophone monitoring units. The remote geophone monitoring units are controlled via a one-way RF communications link between a central control unit and the remote geophone monitoring unit. Data received by the geophones is converted to digital data by means of the remote geophone monitoring unit and is recorded in a recording unit which is a part of the remote geophone monitoring unit. After the survey has been completed the recording unit is simply picked up and carried to the central location.

Use of a recording unit and a one-way RF communications link eliminates problems in the transmission of data from the remote geophone monitoring means to the central recording unit but causes additional problems which are undesirable in a seismic exploration system. The principle problem inherent in such systems is that there is no means by which an operator can determine if the remote geophone monitoring units are operational and there is also no means by which an operator can determine if the seismic exploration system is operational because of the data being obtained is not available until the survey has been completed. The system inadequacies can lead to lost time and thus economic loss if one of the remote geophone monitoring means is not operational or if a particular set of geophones is not operational or if the recording system at the remote geophone monitoring means is not operational. Other subsystem failures can also lead to a loss of data. This loss of data or system inoperability cannot be determined during the survey because no data is available to the operator during the survey. Thus, system reliability is greatly reduced even though the problems inherent in the use of cables have been overcome by use of a one-way RF communications link to control the remote geophone monitoring units.

It is thus an object of this invention to provide a seismic exploration system in which a plurality of remote geophone monitoring means are coupled to a central recording and control station by means of a two-way RF link. It is another object of this invention to provide a seismic exploration system in which a two-way RF link is utilized to provide a central recording and control station with information regarding the operational status of a plurality of remote geophone monitoring units to thereby increase the reliability of the seismic exploration system. Still another specific object of this invention is to provide a seismic exploration system in which error detection and retransmission of data, as required to correct any errors detected, is utilized to increase the reliability of data transmitted by means of a two-way RF link wich couples a central recording station to a plurality of remote geophone monitoring means.

In accordance with the present invention, a seismic exploration system is provided which includes a seismic energy source for generating acoustic waves through the earth and a plurality of remote geophone monitoring means, each of which is positioned in relatively close physical proximity to one or more geophone stations. Each of the geophone stations is coupled by means of a short conductor to the remote geophone monitoring means associated therewith, so the electrical signals generated by the geophones in the geophone stations can be transferred from the geophone station to the associated remote geophone monitoring means. A remote geophone monitoring means is also used to control the seismic energy source.

A central recording and control unit is linked to the plurality of remote geophone monitoring means, including the remote geophone monitoring means controlling the seismic energy source, by means of a two-way RF link. Control of the seismic exploration system is initiated from the central recording and control unit and also the data obtained during the seismic survey is recorded for processing at the central recording and control unit.

Prior to every shot or impact from the seismic energy source, the central recording and control unit interrogates only the remote geophone monitoring means which are to be used to record a particular shot to determine if the remote monitoring means are operational and can be used for recording purposes. Each remote geophone monitoring means has a specific address. When addressed by the central recording and control station the remote geophone monitoring means performs a self-test and transmits the results of the self-test to the central recording and control station. Each remote geophone monitoring means is tested in this manner until all of the remote geophone monitoring means, which are to be utilized in recording seismic data from a particular shot or impact, have been tested. If any remote geophone monitoring means fails to pass the self-test, indicating that the remote geophone monitoring means is not operable, the activation of the seismic energy source is delayed until the remote geophone monitoring means has been put into an operable condition or has been replaced by an operable remote geophone monitoring means.

After the operability of all of the remote geophone monitoring means, which are to be used in a recording a particular shot or impact, has been established, a fire command is issued from the central recording and control station to the remote geophone monitoring means which is controlling the seismic energy source. The seismic energy source is activated in response to the fire command and energy is imparted into the earth.

The energy which is reflected is sensed by the geophone stations, converted to electrical signals and transmitted to the remote geophone monitoring means where the seismic data is stored in memory in digital form.

After the data has been stored in the memory of the plurality of remote geophone monitoring means, a first remote geophone monitoring means is addressed by the central recording and control station and is commanded to transmit the data stored in memory to the central recording and control station. The data is retrieved from the remote geophone monitoring means memory and is transmitted to the central recording and control station over the RF link. Error detection is utilized to insure that the data received at the central recording and control station is a valid. If the error rate is unacceptable then the central recording and control station commands the remote geophone monitoring means to retransmit the data. The retransmitted data is utilized to replace the erroneous data of the first transmission and this procedure is continued until the error rate of the seismic data transmitted from the first remote geophone monitoring means is acceptable. After acceptable data has been receivedfrom the first remote geophone monitoring means and recorded at the central recording and control station, data is retrieved from the remaining plurality of remote geophone monitoring means in a manner similar to that previously described for the first remote geophone monitoring means. After all data from a shot or impact has been recorded at the central recording and control station, the procedure set forth in the preceding paragraphs is repeated until a seismic survey of a desired area has been completed. Different remote geophone monitoring means may be used to change the spread configuration if desired.

Other objects and advantageous of the invention will be apparent from the detailed description of the invention and the appended claims as well as from the detailed description of the drawings in which:

Figure 1:
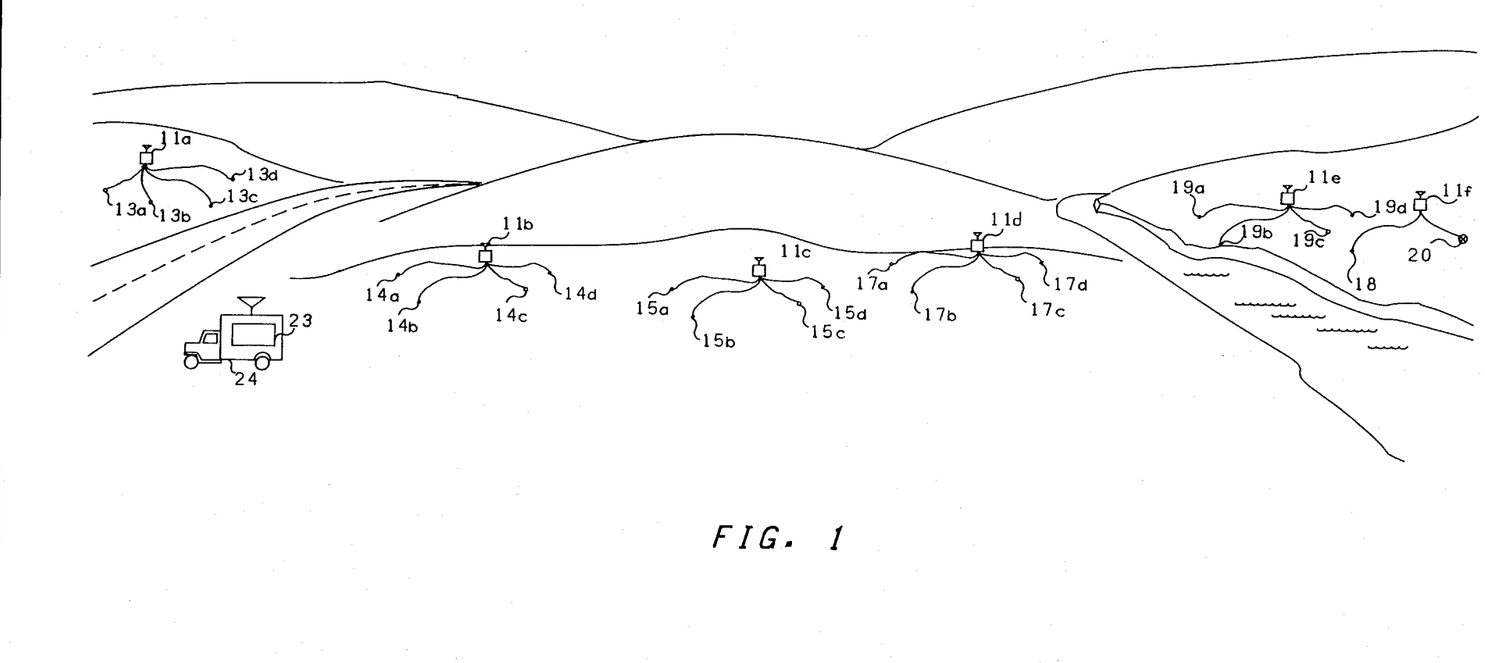
FIG. 1 is an illustration of a possible physical arrangement of the components of the seismic exploration system of the present invention.
Figure 2A:
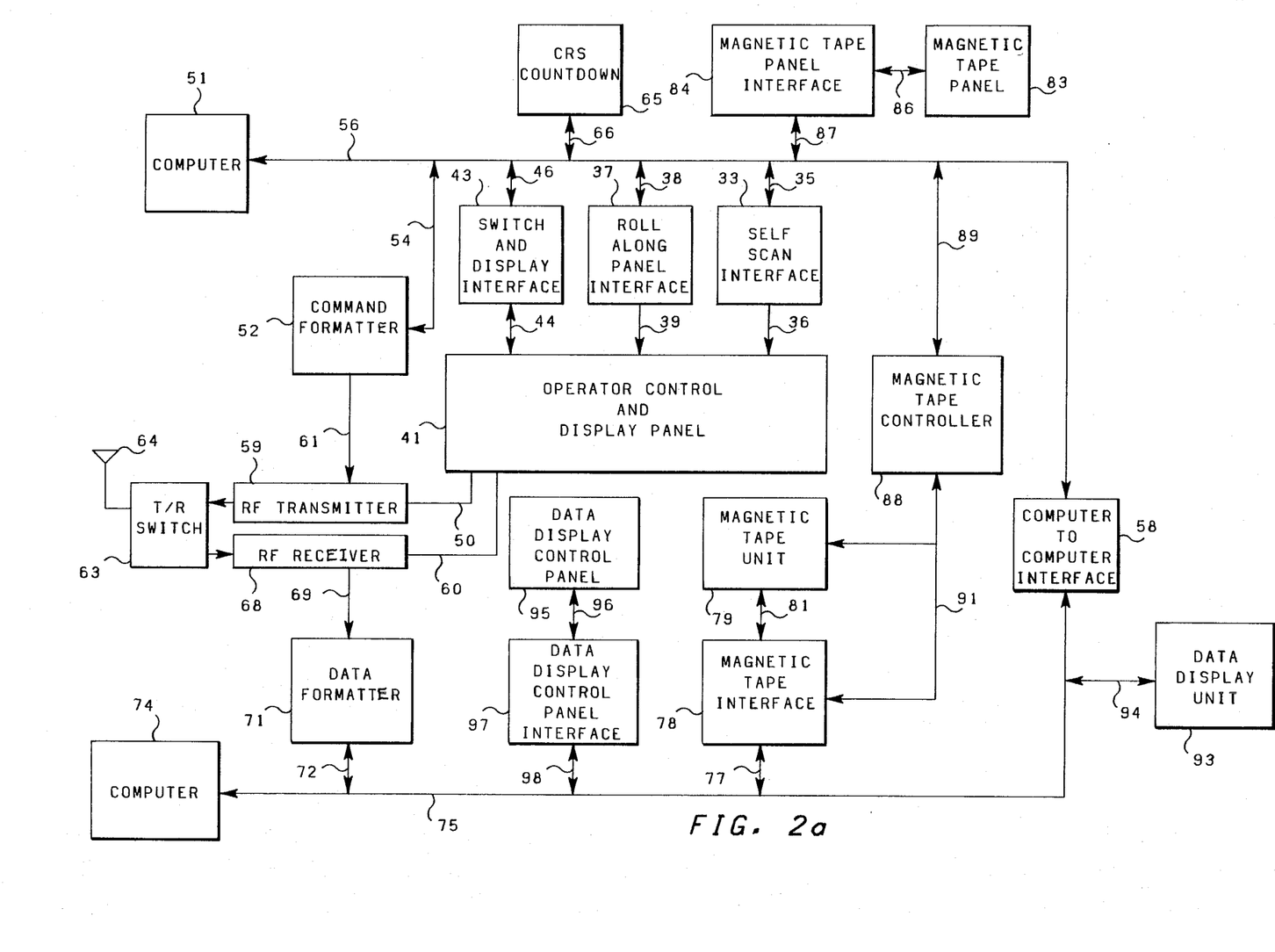
FIG. 2a is a block diagram of the central recording station of the present invention.
Figure 2B:
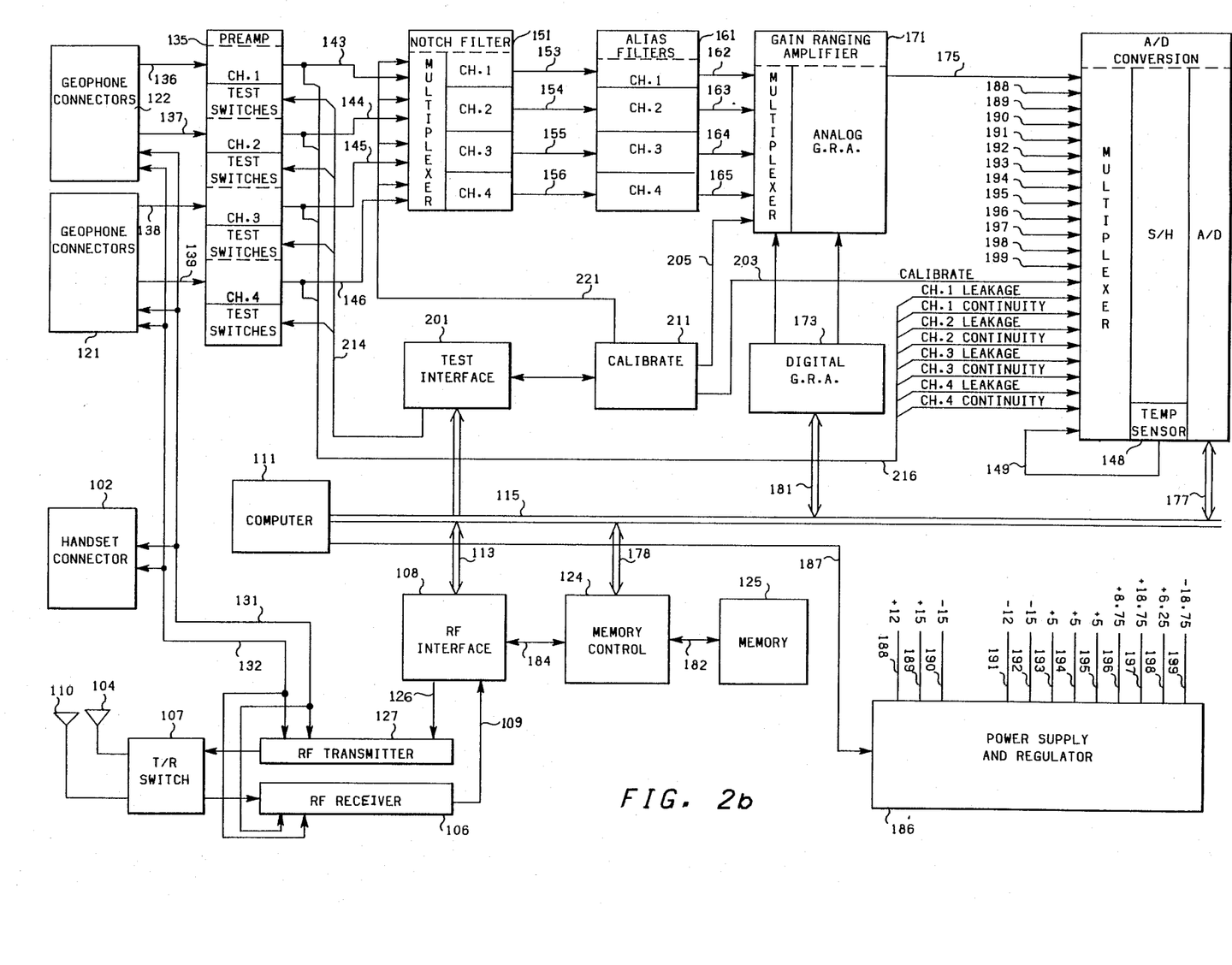
FIG. 2b is a block diagram of the remote telemetry unit of the present invention.

FIGS. 3-73 of U.S. Pat. No. 4,257,098 are hereby incorporatd by reference. The brief description of FIGS. 3-73 in U.S. Pat. No. 4,257,098 is also hereby incorporated by reference.

The detailed description of the drawings and the appendix of U.S. 4,257,098 are hereby incorporated by reference.

That which is claimed is:

1. A seismic system for geophysical exploration comprising:
   a plurality of remote geophone monitoring means, each of said remote geophone monitoring means being adapted to receive electrical signals from at least one geophone means; and
   a central control means for generating electrical signals for initiating the operation of said plurality of remote geophone monitoring means;
   each of said plurality of remote geophone monitoring means comprising:
   means for sampling electrical signals, provided from at least one geophone means, and for converting the sampled electrical signals into digital seismic data;

a first data storage means;

means for providing said digital seismic data to said first data storage means to therein store said digital seismic data;

a first radio frequency transmitter means for transmitting said digital seismic data to said central control means in response to a transmit command from said central control means;

means for providing said digital seismic data from said first storage means to said first radio frequency transmitter means; and a first radio frequency receiver means for receiving a command from said central control means;

said central control means comprising:

a second radio frequency transmitter means for transmitting commands to said plurality of remote geophone monitoring means;

a second radio frequency receiver means for receiving digital seismic data from said plurality of remote geophone monitoring means;

error detection means;

means for providing digital seismic data from said second radio frequency receiver means to said error detection means;

a second data storage means; and means for providing digital seismic data from said error detection means to said second data storage means to therein store the digital seismic data provided from said error detection means, wherein each of said remote geophone monitoring means additionally comprises:

means for conducting a self test in response to a test command from said central control means; and means for providing test data, representative of the results of said self test, to said first radio frequency transmitter means to thereby transmit said test data to said central control means.

2. Apparatus in accordance with claim 1 wherein said means for sampling said electrical signals, provided from said at least one geophone means, and for converting said sampled electrical signals into digital seismic data comprises:

a preamplifier means;

means for supplying said electrical signals to said preamplifier means to therein amplify said electrical signals;

a notch filter means for filtering undesired frequencies;

an alias filter means for preventing aliasing;

a gain ranging amplifier means;

an analog to digital conversion means;

means for supplying the thus amplified electrical signals from said preamplifier means through said notch filter means and said alias filter means to said gain ranging amplifier means to therein sample and amplify the samples of said amplified electrical signals to produce an output having a voltage level which is compatible with the required input voltage level of said analo to digital conversion means; and means for supplying the output, from said gain ranging amplifier means, to said analog to digital conversion means to therein convert to digital form the electrical signals, supplied from the output of said gain ranging amplifier means.

3. Apparatus in accordance with claim 2 wherein said error detection means comprises:

means for detecting the position of any error in a block of data; and means for replacing any thus detected error in a block of data from a particular remote geophone monitoring means with corresponding good data, which is provided from said particular remote geophone monitoring means in response to a command from said central control means to said particular remote geophone monitoring means to retransmit the information which was found to have been received, at least in part, erroneously.

4. Apparatus in accordance with claim 1 wherein said central control means additionally comprises:

means for displaying data; and means for providing digital seismic data from said error detection means to said means for displaying data.

5. Apparatus in accordance with claim 1 wherein said central control means additionally comprises:

means for displaying data; and means for providing test data from said error detection means to said means for displaying data.

6. Apparatus in accordance with claim 5 wherein said test data is provided to said means for displaying data to thereby provide a visual indication of the operational status of said remote geophone monitoring means.

7. Apparatus in accordance with claim 1 wherein said means for conducting a self test comprises:

means for determining the temperature of the respective remote geophone monitoring means;

means for determining if power is available for the respective remote geophone monitoring means; and means for determining if said means for sampling at least one electrical signal, provided from said at least one geophone means, and for converting the sampled electrical signals into digital seismic data is operational.

8. A seismic system for geophysical exploration comprising:

a plurality of remote geophone monitoring means, each of said remote geophone monitoring means being adapted to receive electrical signals from at least one geophone means; and a central control means for generating electrical signals for initiating the operation of said plurality of remote geophone monitoring means;

each of said plurality of remote geophone monitoring means comprising:

means for performing a self test and for generating test data, which is representative of the results of said self test, in response to a test command from said central control means;

a first data storage means;

means for providing said test data to said first data storage means to therein store said test data;

a first radio frequency transmitter means for transmitting the thus stored test data to said central control means in response to a transmit command from said central control means;

means for providing said test data from said first data storage means to said first radio frequency transmitter means;

a first radio frequency receiver means for receiving said test command and said transmit command from said central control means;

said central control means comprising:
  means for generating said test command;
  means for generating said transmit command;
  a second radio frequency transmitter means for transmitting commands to said plurality of remote a geophone monitoring means;
  means for providing said test command and said transmit command to said second radio frequency transmitter means to thereby provide said test command and said transmit command to at least one of said plurality of remote geophone monitoring means;
  a second radio frequency receiver means for receiving said test data from at least one of said plurality of remote geophone monitoring means;
  means for displaying data; and
  means for providing said test data from said second radio frequency receiver means to said means for displaying data to thereby provide an immediate indication of the operability of at least one of said plurality of remote geophone monitoring means.

9. Apparatus in accordance with claim 8 wherein each of said remote geophone monitoring means additionally comprises means for sampling electrical signals, provided from said at least one geophone means, and for converting the sample electrical signals into digital seismic data.

10. Apparatus in accordance with claim 9 wherein said means for performing a self test comprises:
  means for determining the temperature of the respective remote geophone monitoring means;
  means for determining if power is available for the respective remote geophone monitoring means; and
  means for determining if said means for sampling electrical signals, provided from at least one geophone means, and for converting the sample electrical signals into digital seismic data is operational.

11. Apparatus in accordance with claim 8 wherein said means for providing said test data from said second radio frequency receiver means to said means for displaying data comprises:
  error detection means;
  means for supplying said test data from said second radio frequency receiver means to said error detection means; and
  means for supplying said test data from said error detection means to said means for displaying data.

12. Apparatus in accordance with claim 11 wherein said error detection means comprises:
  means for detecting the position of any error in a block of information; and
  means for replacing any thus detected error in a block of data from a particular remote geophone monitoring means with corresponding good data, which is provided from said particular remote geophone monitoring means in response to a command from said central control means to said particular remote geophone monitoring means to retransmit the information which was found to have been received, at least in part, erroneously.

13. A method for performing a seismic geophysical survey wherein a central control means is utilized to control and acquire data from a plurality of remote geophone monitoring means, each of said plurality of remote geophone monitoring means being adapted to receive analog electrical signals from at least one geophone means, comprising the steps of:
  activating at least one of said plurality of remote geophone monitoring means;
  providing electrical signals, representative of seismic waves, from at least one of a plurality of geophone means to a respective one of each activated remote geophone monitoring means, said remote geophone monitoring means performing preselected data processing operations on said analog electrical signals, said preselected data processing operations comprising:
    sampling said analog electrical signals;
    converting the thus sampled analog electrical signals from analog form to digital form; and
    storing the sampled electrical signals, which have been converted to digital form, as seismic data;
  generating a first command to transmit data after seismic data has been stored in all of the remote geophone monitoring means which were activated;
  transmitting said first command to transmit data from said central control means through a two-way radio frequency link to a first one of the activated remote geophone monitoring means;
  retrieving said seismic data from storage and transmitting said seismic data from said first one of the activated remote geophone monitoring means through said two-way radio frequency link to said central control means in response to said first command to transmit data signal;
  detecting any errors in said seismic data provided from the first one of said activated remote geophone monitoring means;
  storing said seismic data at said central control means if the number of errors which are detected in the seismic data provided from the first one of said activated remote geophone monitoring means is less than a predetermined value;
  generating a first retransmit data command if the number of errors present in the seismic data provided from the first one of said activated remote geophone monitoring means is more than said predetermined value;
  transmitting said first retransmit command from said central control means through said two-way radio frequency link to the first one of said activated remote geophone monitoring means;
  retransmitting the seismic data from said first one of said activated remote geophone monitoring means through said two-way radio frequency link to said central control means in response to said first retransmit command;
  utilizing the retransmitted seismic data from the first one of said activated remote geophone monitoring means to correct errors in the seismic data which was transmitted from the first one of said activated remote geophone monitoring means in response to said first command to transmit data;
  generating a test command representative of a command to perform a self test;
  transmitting said test command from said central control means through said two-way radio frequency link to at least one of said plurality of remote geophone monitoring means, at least one of said plurality of remote geophone monitoring means being activated to perform a predetermined self test operation and to store the results of said predetermined self test operation in response to said test command;

generating a first command to transmit test data after all of the remote geophone monitoring means, which were activated to perform the self test operation by said test command, have completed the self test operation and have stored the results of the self test;

transmitting said first command to transmit test data from said central control means through said two-way radio frequency link to a first one of said remote geophone monitoring means, which were activated to perform the self test operation;

retrieving the self test data from storage and transmitting the self test data from said first one of said remote geophone monitoring means, which were activated to perform the self test operation, through said two-way radio frequency link to said central control means in response to said first command to transmit test data;

detecting any errors in the test data provided from said first one of said remote geophone monitoring means, which were activated to perform the self test operation;

displaying the test data, if the number of errors which are present in the test data is less than said predetermined value, to provide an immediate indication of the operability of said first one of said remote geophone monitoring means, which were activated to perform the self test operation;

generating a first retransmit command if the number of errors present in the test data provided from said first one of said remote geophone monitoring means which were activated to perform the self test operation is more than said predetermined value;

transmitting said first retransmit command from said central control means through said two-way radio frequency link to said first one of said remote geophone monitoring means, which were activated to perform the self test operation;

retransmitting the test data from said first one of said remote geophone monitoring means, which were activated to perform the self test operation, through said two-way radio frequency link to said central control means; and using the retransmitted test data to correct the test data which was provided from said first one of said remote geophone monitoring means, which were activated to perform the self test operation, in response to said first command to transmit test data.

14. A method in accordance with claim 13 additionally comprising the steps of:

(A) generating a second command to transmit data after the seismic data from said first one of said activated remote geophone monitoring means has been stored at said central control means;

(B) transmitting said second command to transmit data from said central control means through said two-way radio frequency link to a second one of said activated remote geophone monitoring means;

(C) retrieving said seismic data from storage and transmitting said seismic data from the second one of said activated remote geophone monitoring means through said two-way radio frequency link to said central control means in response to said second command to transmit data signal;

(D) detecting any errors in said seismic data provided from the second one of said activated remote geophone monitoring means;

(E) storing said seismic data at said central control means if the number of errors which are detected in the seismic data provided from the second one of said activated remote geophone monitoring means is less than said predetermined value;

(F) generating a second retransmit data command if the number of errors present in the seismic data provided from the second one of said activated remote geophone monitoring means is more than said predetermined value;

(G) transmitting said second retransmit command from said central control means through said two-way radio frequency link to the second one of said activated remote geophone monitoring means;

(H) retransmitting the seismic data from the second one of said activated remote geophone monitoring means through said two-way radio frequency link to said central control means in response to said second retransmit command;

(I) utilizing the retransmitted seismic data from the second one of said activated remote geophone monitoring means to correct errors in the seismic data which was transmitted from the second one of said activated remote geophone monitoring means in response to said first command to transmit data; and (J) continuing to retrieve data from each one of said activated remote geophone monitoring means in the manner set forth in steps A-H until the seismic data stored in each one of said activated remote geophone monitoring means has been received correctly and stored at said central control means.

15. A method in accordance with claim 13 wherein said step of using the retransmitted seismic data to correct the seismic data transmitted from the first one of said activated remote geophone monitoring means in response to said first command to transmit data comprises using error-free data blocks in the seismic data transmitted from a first one of said activated remote geophone monitoring means in response to said first retransmit command to replace bad data blocks in the seismic data transmitted from a first one of said activated remote geophone monitoring means in response to said first command to transmit data to thereby correct errors in the seismic data provided from the first one of said activated remote geophone monitoring means in response to said first command to transmit data.

16. A method in accordance with claim 13 additionally comprising the steps of:

generating a fire command signal representative of a command to a seismic energy source to impart seismic energy into the earth and representative of a command to a remote geophone monitoring means to activate for seismic data acquisition; and transmitting said fire command signal from said central control means through said two-way radio frequency link to said seismic energy source and to at least one of said plurality of remote geophone monitoring means, said seismic energy source imparting energy into the earth in response to the reception of said fire command signal to thereby generate seismic waves through the earth, at least one of said plurality of remote geophone monitoring means being activated to receive seismic data from said geophone means in response to the reception of said fire command signal.

17. A method in accordance with claim 13 additionally comprising the steps of:
(A) generating a second command to transmit test data after the test data from said first one of said remote geophone monitoring means, which were activated to perform the self test operation, has been correctly transmitted to said central control means;
(B) transmitting said second command to transmit test data from said central control means through said two-way radio frequency link to a second one of the remote geophone monitoring means which were activated to perform the self test operation;
(C) retrieving said test data from storage and transmitting said test data from said second one of said remote geophone monitoring means, which were activated to perform the self test operation, through said two-way radio frequency link to said central control means in response to said second command to transmit test data;
(D) detecting any errors in said test data provided from said second one of said remote geophone monitoring means which were activated to perform the self test operation;
(E) displaying said test data at said central control means if the number of errors which are detected in the test data provided from said second one of said remote geophone monitoring means which were activated to perform the self test operation is less than said predetermined value;
(F) generating a second retransmit data command if the number of errors present in the test seismic data provided from said second one of said remote geophone monitoring means which were activated to perform the self test operation is more than said predetermined value;
(G) transmitting said second retransmit command from said central control means through said two-way radio frequency link to said second one of said remote geophone monitoring means which were activated to perform the self test operation;
(H) retransmitting the test data from said second one of said remote geophone monitoring means, which were activated to perform the self test operation, through said two-way radio frequency link to said central control means in response to said second retransmit command;
(I) utilizing the retransmitted test data from said second one of said remote geophone monitoring means, which were activated to perform the self test operation, to correct errors in the test data which was transmitted from said second one of said remote geophone monitoring means, which were activated to perform the self test operation, in response to said second command to transmit test data; and
(J) continuing to retrieve data from each one of said remote geophone monitoring means, which were activated to perform the self test operation, in the manner set forth in steps A-I until the test data stored in each one of said plurality of remote geophone monitoring means, which were activated to perform the self test operation, has been received correctly at said central control means.

18. A method in accordance with claim 13 wherein said step of using the retransmitted test data to correct the test data transmitted from said first one of said remote geophone monitoring means, which were activated to perform the self test operation, in response to said first command to transmit test data comprises using error-free data blocks in the test data transmitted from said first one of said remote geophone monitoring means, which were activated to perform the self test operation, in response to said first retransmit command to replace bad data blocks in the test data transmitted from said first one of said remote geophone monitoring means, which were activated to perform the self test operation, in response to said first command to transmit test data to thereby correct errors in the test data provided from said first one of said remote geophone monitoring means, which were activated to perform the self test operation, in response to said first command to transmit data.

19. A method in accordance with claim 13 wherein said predetermined self test operation comprises:
determining the temperature of said remote geophone monitoring means, which were activated to perform the self test operation;
determining if power is available to said remote geophone monitoring means, which were activated to perform the self test operation; and
determining if the means for performing said preselected data processing operation associated with said remote geophone monitoring means, which were activated to perform the self test operation, is operational.

20. A method for testing a seismic exploration system wherein a central control means is utilized to control and acquire data from a plurality of remote geophone monitoring means, each of said remote geophone monitoring means being adapted to receive electrical signals from at least one geophone means, comprising the steps of:
generating a first test command representative of a command to a first one of said plurality of remote geophone monitoring means to perform a self test operation;
transmitting said first test command from said central control means through a two-way radio frequency link to said first one of said plurality of remote geophone monitoring means, said first one of said plurality of remote geophone monitoring means being activated to perform a predetermined self test operation and to store the results of said predetermined self test operation in response to said first test command;
generating a first command to transmit data after the results of said predetermined self test operation have been stored in said first one of said plurality of remote geophone monitoring means;
transmitting said first command to transmit data from said central control means through said two-way radio frequency link to said first one of said plurality of remote geophone monitoring means; and
retrieving the test data from storage and transmitting said test data from said first one of said plurality of remote geophone monitoring means through said two-way radio frequency link to said central control means in response to said first command to transmit data, said test data providing information to the central control means as to the operability of said first one of said plurality of remote geophone monitoring means.

21. A method in accordance with claim 20 additionally comprising the step of displaying the test data at the central control means to thereby provide an immediate indication as to the operability of said first one of said plurality of remote geophone monitoring means.

22. A method in accordance with claim 22 comprising the additional steps of:
  detecting any errors in said test data provided from said first one of said plurality of remote geophone monitoring means;
  displaying said test data at said central control means if the number of errors which are detected in the test data provided from said first one of said plurality of remote geophone monitoring means is less than a predetermined value;
  generating a first retransmit data command if the number of errors present in the test data provided from said first one of said plurality of remote geophone monitoring means is greater than said predetermined value;
  transmitting said first retransmit command from said central control means through said two-way radio frequency link to said first one of said plurality of remote geophone monitoring means;
  retransmitting the test data from said first one of said plurality of remote geophone monitoring means through said two-way radio frequency link to said central control means in response to said first retransmit command; and
  utilizing the retransmitted test data from said first one of said plurality of remote geophone monitoring means to correct errors in the test data which was transmitted from said first one of said plurality of remote geophone monitoring means in response to said first command to transmit test data.

23. A method in accordance with claim 22 wherein said step of using the retransmitted test data to correct the test data transmitted from said first one of said plurality of remote geophone monitoring means in response to said first command to transmit test data comprises using error-free data blocks in the retransmitted test data to replace bad data blocks in the test data transmitted from said first one of said plurality of remote geophone monitoring means in response to said frst command to transmit test data to thereby correct errors in the test data provided from said first one of said plurality of remote geophone monitoring means in response to said first command to transmit test data.

24. A method in accordance with claim 23 additionally comprising the steps of:
  (A) generating a second test command representative of a command to a second one of said plurality of remote geophone monitoring means to perform a self test operation after the test data from said first one of said remote geophone monitoring means has been correctly transmitted to said central control means;
  (B) transmitting said second test command from said central control means through said two-way radio frequency link to said second one of said plurality of remote geophone monitoring means, said second one of said plurality of remote geophone monitoring means being activated to perform a predetermined self test operation and to store the results of said predetermined self test operation in response to said second test command;
  (C) generating a second command to transmit data after the results of said predetermined self test operation have been stored in said second one of said plurality of remote geophone monitoring means;
  (D) transmitting said second command to transmit test data from said central control means through said two-way radio frequency link to said second one of said plurality of remote geophone monitoring means;
  (E) retrieving said test data from storage and transmitting said test data from said second one of said plurality of remote geophone monitoring means through said two-way radio frequency link to said central control means in response to said second command to transmit data signal;
  (F) detecting any errors in said test data provided from said second one of said plurality of remote geophone monitoring means;
  (G) displaying said test data at said central control means if the number of errors which are detected in the test data provided from said second one of said plurality of remote geophone monitoring means is less than said predetermined value;
  (H) generating a second retransmit data command if the number of errors present in the test data provided from said second one of said plurality of remote geophone monitoring means is greater than said predetermined value;
  (I) transmitting said second retransmit command from said central control means through said two-way frequency link to said second one of said plurality of remote geophone monitoring means;
  (J) retransmitting the test data from said second one of said plurality of remote geophone monitoring means through said two-way radio frequency link to said central control means in response to said second retransmit command;
  (K) utilizing the retransmitting test data from said second one of said plurality of remote geophone monitoring means to correct errors in the data which was transmitted from said second one of said plurality of remote geophone monitoring means in response to said second first command to transmit test data; and
  (L) continuing to test each one of said plurality of remote geophone monitoring means in the manner set forth in steps A-K until each one of said plurality of remote geophone monitoring means has been tested.

25. A method in accordance with claim 20 wherein said predetermined self test operation comprises:
  determining the temperature of said first one of said plurality of remote geophone monitoring means;
  determining if power is available to said first one of said plurality of remote geophone monitoring means; and
  determining if the means for receiving electrical signals from said at least one geophone means, associated with said first one of said plurality of remote geophone monitoring means, is operational.

26. A method for testing a seismic exploration system wherein a central control means is utilized to control and acquire data from a plurality of remote geophone monitoring means, each of said remote geophone monitoring means being adapted to receive electrical signals from at least one geophone means, comprising the steps of:

generating a test command representative of a command to perform a self test;

transmitting said test command from said central control means through a two-way radio frequency link to a first group of said plurality of remote geophone monitoring means, said first group of said plurality of remote geophone monitoring means being activated to perform a predetermined self test operation and to store the results of said predetermined self test operation in response to said first test command;

generating a first command to transmit data after the results of said predetermined self test operation have been stored in said first group of said plurality of remote geophone monitoring means;

transmitting said first command to transmit data from said central control means through said two-way radio frequency link to a first one of said first group of said plurality of remote geophone monitoring means; and retrieving the test data from storage and transmitting said test data from said first one of said first group of said plurality of remote geophone monitoring means through said two-way radio frequency link to said central control means in response to said first command to transmit data, said test data providing information to the central control means as to the operability of said first one of said first group of said plurality of remote geophone monitoring means.

27. A method in accordance with claim 26 additionally comprising the step of displaying the test data at the central control means to thereby provide an immediate indication as to the operability of said first one of said first group of said plurality of remote geophone monitoring means.

28. A method in accordance with claim 26 comprising the additional steps of:

detecting any errors in said test data provided from the first one of said remote first group of said plurality of geophone monitoring means;

displaying said test data at said central control means if the number of errors which are detected in the test data provided from said first one of said first group of said plurality of remote geophone monitoring means is less than a predetermined value;

generating a first retransmit data command if the number of errors present in the test data provided from said first one of said first group of said plurality of remote geophone monitoring means is greater than said predetermined value;

transmitting said first retransmit command from said central control means through said two-way radio frequency link to said first one of said first group of said plurality of remote geophone monitoring means;

retransmitting the test data from said first one of said first group of said plurality of remote geophone monitoring means through said two-way radio frequency link to said central control means in response to said first retransmit command; and utilizing the retransmitted test data from said first one of said first group of said plurality of remote geophone monitoring means to correct errors in the test data which was transmitted from said first one of said first group of said plurality of remote geophone monitoring means in response to said first command to transmit test data.

29. A method in accordance with claim 28 wherein said steps of using the retransmitted test data to correct the test data transmitted from said first one of said first group of said plurality of remote geophone monitoring means in response to said first command to transmit test data comprises using error-free data blocks in the retransmitted test data to replace bad data blocks in the test data transmitted from said first one of said first group of said plurality of remote geophone monitoring means in response to said first command to transmit test data to thereby correct errors in the test data provided from said first one of said first group of said plurality of remote geophone monitoring means in response to said first command to transmit test data.

30. A method in accordance with claim 29 additionally comprising the steps of:

(A) generating a second command to transmit test data after the test data from said first one of said first group of said plurality of remote geophone monitoring means has been correctly transmitted to said central control means;

(B) transmitting said second command to transmit test data from said central control means through said two-way radio frequency link to a second one of said first group of said plurality of remote geophone monitoring means;

(C) retrieving the test data from storage and transmitting the test data from said second one of said first group of said plurality of remote geophone monitoring means through said two-way radio frequency link to said central control means in response to said second command to transmit test data;

(D) detecting any errors in the test data provided from said second one of said first group of said plurality of remote geophone monitoring means;

(E) displaying the test data at said central control means if the number of errors which are detected in the test data provided from said second one of said first group of said plurality of remote geophone monitoring means, is less than said predetermined value;

(F) generating a second retransmit data command if the number of errors present in the test data provided from said second one of said first group of said plurality of remote geophone monitoring means is greater than said predetermined value;

(G) transmitting said second retransmit command from said central control means through said two-way radio frequency link to said second one of said first group of said plurality of remote geophone monitoring means;

(H) retransmitting the test data from said second one of said first group of said plurality of remote geophone monitoring means through said two-way radio frequency link to said central control means in response to said second retransmit command;

(I) utilizing the retransmitted test data from said second one of said first group of said plurality of remote geophone monitoring means to correct errors in the test seismic data which was transmitted from said second one of said first group of said plurality of remote geophone monitoring means in response to said second command to transmit test data; and (J) continuing to retrieve test data from each one of said first group of said plurality of remote geophone monitoring means in the manner set forth in steps A–I until the test data stored in each one of said first group of said plurality of remote geophone monitoring means has been received at said central control means.

31. A method in accordance with claim 26 wherein said predetermined self test operation comprises:
determining the temperature of each one of said first group of said plurality of remote geophone monitoring means;
determining if power is available to each one of said first group of said plurality of remote geophone monitoring means; and
determining if the means for receiving electrical signals from said at least one geophone means, associated with each one of said first group of said plurality of remote geophone monitoring means, is operational.

32. A seismic system for geophysical exploration comprising:
a plurality of remote geophone monitoring means, each of said remote geophone monitoring means being adapted to receive electrical signals from at least one geophone means; and
a central control means for generating electrical signals for initiating the operating of said plurality of remote geophone monitoring means;
each of said plurality of remote geophone monitoring means comprising:
means for sampling electrical signals, provided from at least one geophone means, and for converting the sampled electrical signals into digital seismic data;
a first data storage means;
means for providing said digital seismic data to said first data storage means to therein store said digital seismic data;
a first radio frequency transmitter means for transmitting said digital seismic data to said central control means in response to a transmit command from said central control means;
means for providing said digital seismic data from said first storage means to said first radio frequency transmitter means;
a first radio frequency receiver means for receiving a command from said central control means; and
a first programmable digital computer means for controlling the remote geophone monitoring means in response to commands received from said central control means;
said central control means comprising:
a second radio frequency transmitter means for transmitting commands to said plurality of remote geophone monitoring means;
a second radio frequency receiver means for receiving digital seismic data from said plurality of remote geophone monitoring means;
a second data storage means;
means for providing digital seismic data from said second radio frequency receiver means to said second data storage means to therein store the digital seismic data provided from said second radio frequency receiver means; and
a second programmable digital computer means for controlling said central control means and for generating commands to be transmitted to said plurality of remote geophone monitoring means; wherein each of said remote geophone monitoring means additionally comprises:
means for conducting a self test in response to a test command from said central control means; and
means for providing test data, representative of the results of said self test, to said first radio frequency transmitter means to thereby transmit said test data to said central control means.

33. Apparatus in accordance with claim 32 wherein said first programmable digital computer means is a microprocessor and said second programmable digital computer means is a microprocessor.

34. Apparatus in accordance with claim 32 wherein said means for sampling said electrical signals, provided from said at least one geophone means, and for converting said sampled electrical signals into digital seismic data comprises:
a preamplifier means;
means for supplying said electrical signals to said preamplifier means to therein amplify said electrical signals;
a notch filter means for filtering undesired frequencies;
an alias filter means for preventing aliasing;
a gain ranging amplifier means;
an analog to digital conversion means;
means for supplying the thus amplified electrical signals from said preamplifier means through said notch filter means and said alias filter means to said gain ranging amplifier means to therein sample and amplify the samples of said amplified electrical signals to produce an output having a voltage level which is compatible with the required input voltage level of said analog to digital conversion means; and
means for supplying the output, from said gain ranging amplifier means, to said analog to digital conversion means to therein convert to digital form the electrical signals, supplied from the output of said gain ranging amplifier means.

35. Apparatus in accordance with claim 32 wherein said means for providing data from said second radio frequency receiver means to said second data storage means comprises:
error detection means;
means for providing digital seismic data from said second radio frequency receiver means to said error detection means; and
means for providing digital seismic data from said error detection means to said second data storage means.

36. Apparatus in accordance with claim 35 wherein said error detection means comprises:
means for detecting the position of any error in a block of data; and
means for replacing any thus detected error in a block of data from a particular remote geophone monitoring means with corresponding good data, which is provided from said particular remote geophone monitoring means in response to a command from said central control means to said particular remote geophone monitoring means to retransmit the information which was found to have been received, at least in part, erroneously.

37. Apparatus in accordance with claim 35 wherein said central control means additionally comprises:
means for displaying data; and
means for providing digital seismic data from said error detection means to said means for displaying data.

38. Apparatus in accordance with claim 32 wherein said central control means additionally comprises:
  means for displaying data; and
  means for providing data from said error detection means to said means for displaying data.

39. Apparatus in accordance with claim 38 wherein said test data is provided to said means for displaying data to thereby provide a visual indication of the operational status of said remote geophone monitoring means.

40. Apparatus in accordance with claim 32 wherein said means for conducting a self test comprises:
  means for determining the temperature of the respective remote geophone monitoring means;
  means for determining if power is available for the respective remote geophone monitoring means; and
  means for determining if said means for sampling at least one electrical signal, provided from said at least one geophone means, and for converting the sampled electrical signals into digital seismic data is operational.

* * * * *

UNITED STATES PATENT AND TRADEMARK OFFICE
CERTIFICATE OF CORRECTION

PATENT NO. : 4,493,063

DATED : January 8, 1985

INVENTOR(S) : Harold A. Tims et al

It is certified that error appears in the above-identified patent and that said Letters Patent are hereby corrected as shown below:

Claim 2, column 5, line 62, "analo" should be --- analog ---.

Claim 3, column 6, line 1, "claim 2" should be --- claim 1 ---.

Claim 22, column 13, line 8, "claim 22" should be --- claim 20 ---.

Signed and Sealed this

Seventh Day of January 1986

[SEAL]

Attest:

DONALD J. QUIGG

Attesting Officer

Commissioner of Patents and Trademarks